United States Patent [19]

Ogasawara et al.

[11] Patent Number: 5,367,864
[45] Date of Patent: Nov. 29, 1994

[54] RIDING LAWN MOWER

[75] Inventors: Hiroyuki Ogasawara; Nobuyuki Yamashita; Akira Minoura, all of Osaka, Japan

[73] Assignee: Kubota Corporation, Osaka, Japan

[21] Appl. No.: 134,892

[22] Filed: Oct. 13, 1993

[30] Foreign Application Priority Data

Feb. 23, 1993 [JP] Japan ............... 5-032343

[51] Int. Cl.⁵ .............. A01D 34/00; A01D 67/00; B60G 9/00
[52] U.S. Cl. .............. 56/15.8; 56/DIG. 10; 180/900
[58] Field of Search ......... 56/15.8, 14.7, 14.9, 56/15.7, 15.9, 16.9, 17.1, 320.1, 210, 214; 180/900, 89.13

[56] References Cited

U.S. PATENT DOCUMENTS

| | | | |
|---|---|---|---|
| 3,608,288 | 9/1971 | Heth et al. | 56/15.8 |
| 4,311,204 | 1/1982 | Shupert | 56/14.7 X |
| 4,325,211 | 4/1982 | Witt et al. | 56/15.8 |
| 4,514,967 | 5/1985 | Scanland et al. | 56/14.7 |
| 5,181,370 | 1/1993 | Simone | 56/14.7 |
| 5,207,187 | 5/1993 | Kurohara et al. | 123/41.7 |

FOREIGN PATENT DOCUMENTS 2-208132  8/1990  Japan.

Primary Examiner—Stephen J. Novosad
Attorney, Agent, or Firm—Fisher & Associates

[57] ABSTRACT

A riding lawn mower having a mower unit suspended from a chassis frame through a link mechanism. A driver's seat supporting auxiliary frame is provided, which includes a foot rest, a seat mount and right and left rear wheel fenders formed integral with one another. The auxiliary frame has a forward end portion thereof supported by the chassis frame to be pivotable about a cross pin, and a rear end portion supported by the chassis frame through a suspension mechanism. The cross pin is disposed adjacent a shift pedal and a brake pedal, while the suspension mechanism is disposed below the driver's seat.

6 Claims, 3 Drawing Sheets

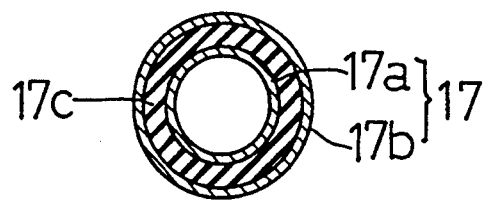
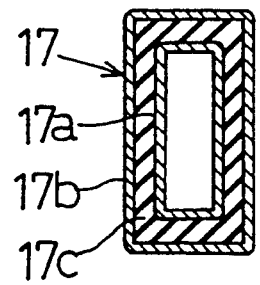
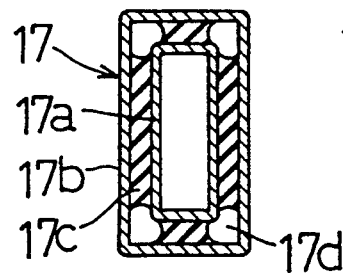
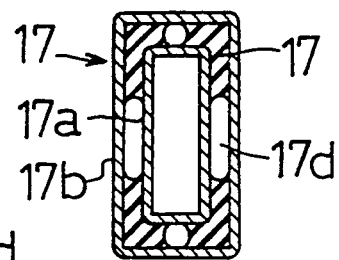
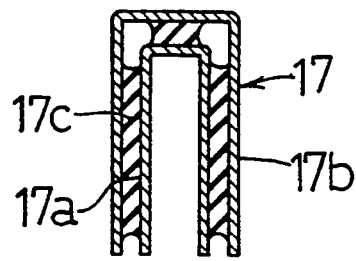
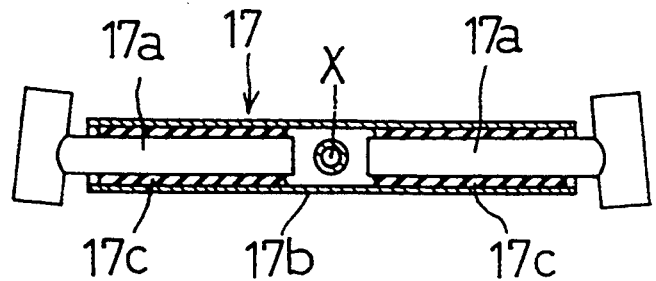

RIDING LAWN MOWER

BACKGROUND OF THE INVENTION

1. Field of the Invention

The present invention relates to a riding lawn mower having a mower unit attached to a lower part of a chassis frame, and a driver's seat mounted on an upper part of the chassis frame.

2. Description of the Related Art

In this type of riding lawn mower, as disclosed in U.S. Pat. No. 5,207,187, for example, the chassis frame is supported by front wheels and rear wheels through a transmission case and an axle case. Rear wheel fenders are attached to the chassis frame, and a driver's seat is mounted on the fenders. The driver's seat has one end thereof supported by the fenders to be pivotable about a transverse axis, with the other end of the seat connected to the fenders through a suspension mechanism in the form of springs. This construction allows a limited distance between the transverse axis and suspension mechanism. Consequently, the suspension mechanism alone cannot fully absorb vibrations caused by uneven ground surfaces and transmitted from the wheels. This construction provides little comfort to the seated driver.

In order that the driver's seat may give improved comfort, it is conceivable to connect the rear wheels to the chassis frame indirectly through a suspension mechanism. That is, a frame supported by the rear wheels is connected to a rear portion of the chassis frame to be vertically pivotable about a transverse axis, and a suspension mechanism is mounted between the rear wheel frame and chassis frame. Alternatively, as disclosed in Japanese Patent Publication Kokai No. 2-208132, the chassis frame may be connected to the rear wheels through a suspension mechanism. A grass cutting operation is carried out often with a gauge wheel of the mower unit raised from the ground, as otherwise the gauge wheel could harm the grass. However, in either of the above support structures where the chassis frame is connected to the rear wheels through a suspension mechanism, the suspension mechanism in its cushioning motion causes the chassis frame to move vertically toward and away from the ground during such a grass cutting operation. As a result, variations occur in height over the ground of the mower unit attached to the chassis frame. This brings about a drawback of uneven cutting height which is intolerable from the standpoint of mower's performance.

SUMMARY OF THE INVENTION

The object of the present invention is to provide a mounting structure for connecting the driver's seat to the chassis frame in a way to assure good comfort to the seated driver while avoiding the uneven cutting height due to the cushioning motion of the suspension mechanism.

The above object is fulfilled, according to the present invention, by a riding lawn mower comprising an auxiliary frame including a foot rest in a forward region thereof, and mar wheel fenders in a rearward region thereof, the auxiliary frame having a forward end portion thereof supported by the chassis frame through a pivotal axis, and a rear end portion supported by the chassis frame through a suspension.

With the above driver's seat mounting structure, an increased distance is secured between the pivotal axis and suspension. Compared with the prior art structures, this mounting structure provides an effective cushioning function to assure the seated driver of a comfortable ride even on a rough ground.

The mower unit attached to the chassis frame does not move vertically under direct influences of movement of the seat supporting auxiliary frame even when the latter moves vertically by the cushioning function of the suspension. Consequently, variations in height over the ground of the mower unit are suppressed during a grass cutting operation with the gauge wheel raised from the ground.

In a preferred embodiment of the invention, control pedals such as a shift pedal and a brake pedal are arranged adjacent the pivotal axis of the auxiliary frame. This arrangement provides the advantage that a pivotal motion of the auxiliary frame results in a minimal variation in positional relationship of the pedals to the foot rest.

Other features and advantages of the tiding lawn mower according to the present invention will be apparent from the description of preferred embodiments of the invention, as illustrated in the accompanying drawings.

BRIEF DESCRIPTION OF THE DRAWINGS

FIG. 4 is a side view in vertical section of a front axle.

FIG. 5a is a side view in vertical section of a front axle in another embodiment of the invention.

FIG. 5b is a view similar to FIG. 5a and showing a modified front axle.

FIG. 5c is a view similar to FIG. 5a and showing a further modified front axle.

FIG. 6 is a side view in vertical section of a front axle in yet another embodiment of the invention.

FIG. 7 is a front view in vertical section of a front axle in a further embodiment of the invention.

DETAILED DESCRIPTION OF THE PREFERRED EMBODIMENTS

An embodiment of the present invention will be described hereinafter with reference to the drawings.

Figure 1:
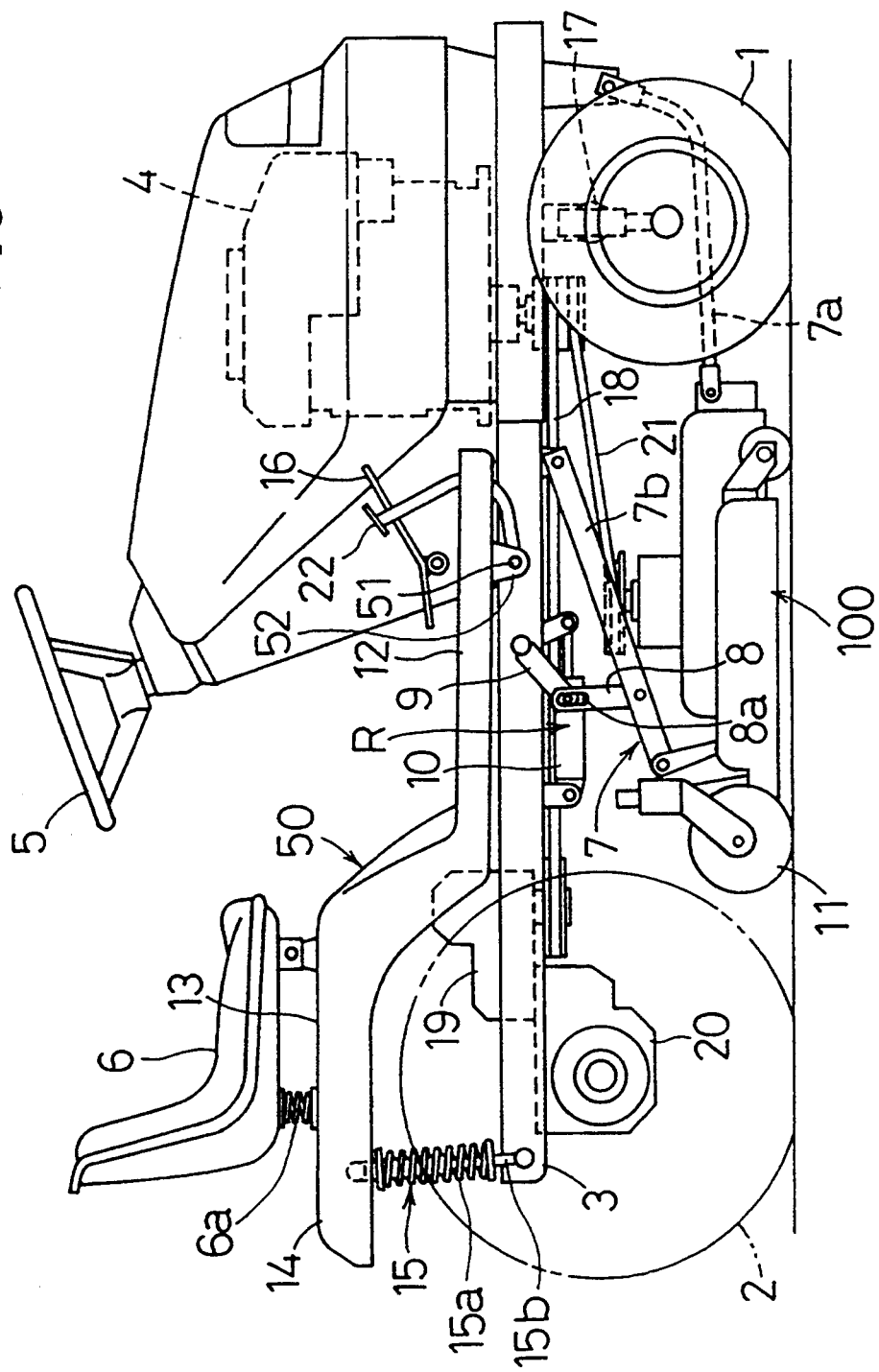
FIG. 1 is a side elevation of a riding lawn mower according to the present invention.

FIG. 1 shows a midmount type riding lawn mower having a pair of right and left dirigible front wheels 1, a pair of right and left rear drive wheels 2, and a chassis frame 3 supported by the front and rear wheels 1 and 2. The chassis frame 3 extends longitudinally of the mower, and includes an engine 4 mounted in a forward region thereof, and a steering wheel 5 and a driver's seat 6 arranged in a rearward region. A mower unit 100 is suspended from the chassis frame 3 between the front and rear wheels 1 and 2 through a parallel link mechanism 7 including front links 7a and rear links 7b. A vertical link 8 is connected to the rear links 7b, and a lift link 9 of inverted L-shape is connected to the vertical link 8. A hydraulic cylinder 10 is connected to the lift link 9. With this construction, the hydraulic cylinder 10 is operable to move the mower unit 100 up and down.

The vertical link 8 defines a slot in an upper portion thereof. A grass cutting operation may be carried out selectively in a suspending mode in which the lift link 9 supports the vertical link 8 by the upper end of the slot 8a, thereby to raise a gauge wheel 11 of the mower unit 100 from the ground, and in a floating mode in which the lift link 9 is allowed to float in an intermediate portion of the slot 8a, thereby to place the gauge wheel 11 in contact with the ground.

As shown in FIG. 1, the driver's seat 6 is mounted on an auxiliary frame 50 disposed above the chassis frame 3. The auxiliary frame 50 is formed of a single piece of sheet metal to define a foot rest 12, a seat mount 13 and right and left rear wheel fenders 14. The auxiliary frame 50 is pivotally connected in a forward position thereof to the chassis frame 3 through a cross pin 51. A rear position of the auxiliary frame 50 is connected to the chassis frame 3 through a spring suspension mechanism 15 including springs 15a and connecting rods 15b. The cross pin 51 is supported by brackets 52 formed on a lower forward surface of the auxiliary frame 50.

The driver's seat 6 is mounted on an upper surfaces of the rear wheel fenders 14 through a spring cushion 6a.

The cross pin 51 is disposed adjacent a shift pedal 16 and a brake pedal 22, so that a pivoting motion about the cross pin 51 of the auxiliary frame 50 results in a minimal variation in positional relationship between the pedals 16 and 22 and the driver's feet on the foot rest 12. In this embodiment, the shift pedal 16 is attached to a lower position of a steering column, while the brake pedal 22 is pivotably connected to the cross pin 51.

Figure 2:
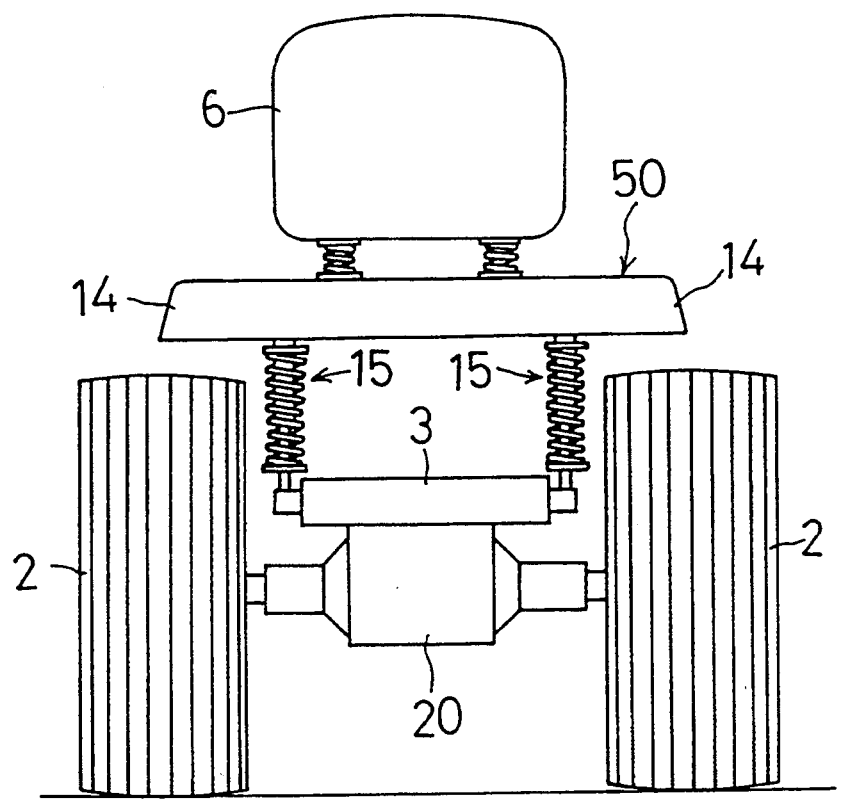
FIG. 2 is a rear view of a rear portion of the lawn mower.

As seen from FIG. 2, the rear wheels 2 are connected to the chassis frame 3 through a transmission case 20. The suspension mechanism 15 has the springs 15a and connecting rods 15b distributed to right and left sides of the chassis frame 3.

Figure 3:
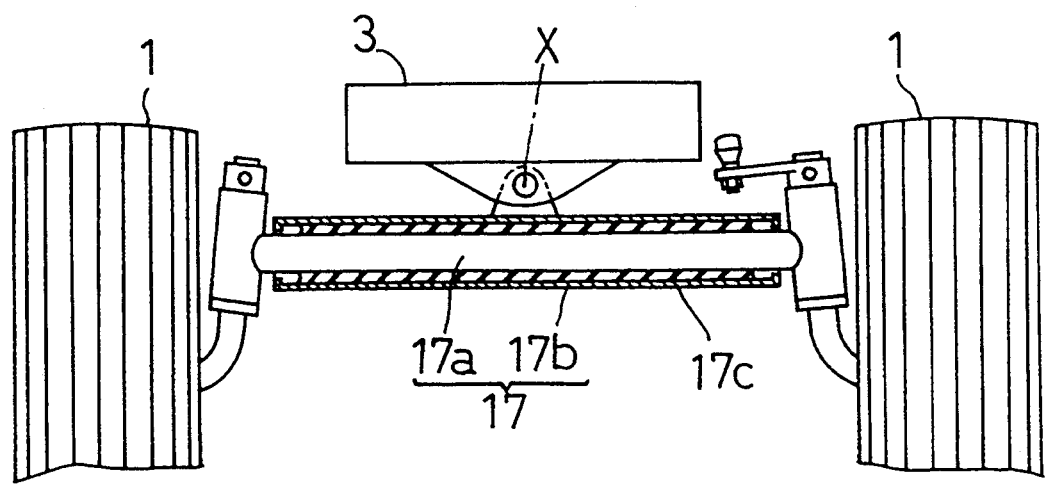
FIG. 3 is a front view, partly in section, of a front wheel support structure.

As shown in FIG. 3, the front wheels 1 are connected to the chassis frame 3 to be capable of rolling motion about a fore and aft axis X. An axle 17 of the front wheels 1 has a double round pipe structure as shown in FIG. 4, including an inner pipe 17a, an outer pipe 17b, and a vibration absorbing rubber bush 17c baked tight therebetween. This structure damps vibrations transmitted from the front wheels 1 to the chassis frame 3 through connecting pins for enabling the rolling motion.

As shown in FIG. 1, the rear wheels 2 are driven by the engine 4 through a belt transmission device 18, a hydrostatic stepless transmission 19, and a change speed device mounted in the transmission case 20. The mower unit 100 is driven by the engine 4 through a belt transmission device 21.

In the above embodiment, the entire auxiliary frame 50 for supporting the driver's seat 6 is formed of a single piece of sheet metal. Instead, the foot rest, seat mount and right and left fenders may be formed separately and connected to one another.

As shown in FIGS. 5a, 5b and 5c, the front axle 17 may be formed of an inner and outer square pipes 17a and 17b, and rubber 17c baked tight therebetween. The rubber 17c may fill part of a space, and not a whole space, between the inner pipe 17a and outer pipe 17b to leave voids 17d therein.

Further, as shown in FIG. 6, the front axle 17 may be formed of an inner and outer inverted U-shape members. In this case also, rubber may be mounted between the inner and outer members.

As shown in FIG. 7, the inner pipe 17a of the front axle 17 having the double square pipe structure may be divided into a right portion and a left portion.

What is claimed is:

1. A riding lawn mower comprising:
   a chassis frame supported by front wheels and mar wheels;
   a mower unit suspended from said chassis frame through a vertically movable link mechanism;
   an auxiliary frame including a foot rest in a forward region thereof, and rear wheel fenders in a rearward region thereof, said auxiliary frame having a forward end portion thereof supported by said chassis frame through pivot means, and a mar end portion supported by said chassis frame through suspension means; and
   a driver's seat mounted on said auxiliary frame.

2. A riding lawn mower as defined in claim 1, wherein said pivot means includes a pivot axis extending transversely of said chassis frame.

3. A riding lawn mower as defined in claim 2, further comprising control pedals arranged adjacent said pivot axis.

4. A riding lawn mower as defined in claim 3, wherein at least one of said control pedals is pivotable about said pivot axis.

5. A riding lawn mower as defined in claim 1, wherein said foot rest and said rear wheel fenders are formed integral with said auxiliary frame.

6. A riding lawn mower as defined in claim 1, wherein said driver's seat is mounted on said rear wheel fenders.

* * * * *